United States Patent
Yanagisawa et al.

(10) Patent No.: US 10,118,856 B2
(45) Date of Patent: *Nov. 6, 2018

(54) LEAD-FREE GLASS AND SEALING MATERIAL

(71) Applicant: Central Glass Company, Limited, Ube-shi, Yamaguchi (JP)

(72) Inventors: Masamichi Yanagisawa, Matsusaka (JP); Jun Hamada, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/537,911

(22) PCT Filed: Dec. 22, 2015

(86) PCT No.: PCT/JP2015/085734
§ 371 (c)(1),
(2) Date: Jun. 20, 2017

(87) PCT Pub. No.: WO2016/114075
PCT Pub. Date: Jul. 21, 2016

(65) Prior Publication Data
US 2017/0349479 A1    Dec. 7, 2017

(30) Foreign Application Priority Data

Jan. 15, 2015 (JP) ................................ 2015-005534
Dec. 9, 2015 (JP) ................................ 2015-239929

(51) Int. Cl.
```
C03C 3/21      (2006.01)
C03C 8/04      (2006.01)
C03C 8/24      (2006.01)
C03C 3/12      (2006.01)
C03C 27/04     (2006.01)
C03C 8/14      (2006.01)
```

(52) U.S. Cl.
CPC ............... *C03C 3/122* (2013.01); *C03C 3/21* (2013.01); *C03C 8/04* (2013.01); *C03C 8/14* (2013.01); *C03C 8/24* (2013.01); *C03C 27/046* (2013.01); *H05K 999/99* (2013.01)

(58) Field of Classification Search
CPC .............. C03C 8/04; C03C 8/24; C03C 3/122
See application file for complete search history.

(56) References Cited

U.S. PATENT DOCUMENTS

| | | | |
|---|---|---|---|
| 7,871,949 B2 * | 1/2011 | Lee ........................... | C03C 8/02 428/410 |
| 8,022,000 B2 * | 9/2011 | Sawai ....................... | H01J 5/20 501/14 |
| 8,470,723 B2 | 6/2013 | Naito et al. | |
| 9,815,735 B2 * | 11/2017 | Miyazawa ................. | C03C 8/24 |
| 2005/0233885 A1 | 10/2005 | Yoshida et al. | |
| 2009/0199897 A1 | 8/2009 | Naito et al. | |
| 2016/0168017 A1 | 6/2016 | Miyazawa et al. | |

FOREIGN PATENT DOCUMENTS

| | | | |
|---|---|---|---|
| CN | 101781090 A | | 7/2010 |
| JP | 11-312948 A | | 11/1999 |
| JP | 2004-250276 A | | 9/2004 |
| JP | 2007-182347 A | | 7/2007 |
| JP | 2009-209032 A | | 9/2009 |
| JP | 2011079694 A | * | 4/2011 |
| WO | WO 2015/029792 A1 | | 3/2015 |

OTHER PUBLICATIONS

International Search Report (PCT/ISA/210) issued in PCT Application No. PCT/JP2015/085734 dated Mar. 15, 2016 with English translation (5 pages).
Japanese-language Written Opinion (PCT/ISA/237) issued in PCT Application No. PCT/JP2015/085734 dated Mar. 15, 2016 (4 pages).

* cited by examiner

*Primary Examiner* — Karl E Group
(74) *Attorney, Agent, or Firm* — Crowell & Moring LLP

(57) ABSTRACT

What is disclosed is a lead-free glass, which is a $V_2O_5$—$TeO_2$—RO (at least one selected from the group consisting of MgO, CaO, SrO, and BaO)—ZnO glass and has a low softening point, comprising: 5-55 wt % of $V_2O_5$, 5-75 wt % of $TeO_2$, 1-25 wt % of RO (at least one selected from the group consisting of MgO, CaO, SrO, and BaO) in total, 0.1-6 wt % of ZnO, and 0.1-3 wt % of $R_2O$ (at least one selected from the group consisting of $Li_2O$, $Na_2O$, and $K_2O$) in total. This glass can be used as a sealing material providing fluidity which is capable of being sealed at a temperature of 400° C. or less.

5 Claims, No Drawings

LEAD-FREE GLASS AND SEALING MATERIAL

TECHNICAL FIELD

The present invention relates to a sealing material using a lead-free glass having a low softening point.

BACKGROUND ART

Various solders and glasses have been used as an adhesive material and a sealing material of electronic components until now. In particular, gold-tin solder and lead glass have been used because there is a case where heat-resistance of parts of a semiconductor package, a crystal unit, a MEMS, etc. is low that is approximately 400° C. Materials used for them are required, according to their use, to have various characteristics such as chemical durability, mechanical strength, fluidity, etc. In particular, in case of using them as the sealing material, fluidity at a low temperature is mentioned as an important factor.

In case that the above-mentioned fluidity is insufficient, it is not possible to obtain the characteristics required in each electronic component because there is a risk of leaking out from a sealed part. In Patent Publication 1, the gold-tin solder is used for manufacturing a piezoelectric vibrator incorporating a crystal unit, and sealing at 250° C. to 500° C. is disclosed. On the other hand, gold-tin solder is high-priced and lead glass contains a large amount of PbO which has a heavy burden on a human body and on the environment. Therefore, an alternative material has been required.

As the above alternative material, for example, Patent Publication 2 proposes a $V_2O_5$—$TeO_2$—BaO—ZnO glass as a glass having a low softening point. The publication discloses a glass having four components such as 16-80 wt % of $V_2O_5$, 0-60 wt % of $TeO_2$, 4-50 wt % of BaO, and 0-40 wt % of ZnO, or a glass where a lead-free low softening point glass, which is composed of 40-80 wt % of $V_2O_5$, 0-40 wt % of ZnO, and 10-50 wt % of BaO, is calculated as 100 pts·wt, and where 1-60 pts·wt of $TeO_2$ is added to 100 pts·wt of the three components, thereby is prepared. Furthermore, examples in the publication show that softening points the glasses have are 310-320° C. In the publication, there is description of the fact that "fluidity" is good, but there is no description about the actual evaluation method. Therefore, detailed degree of the fluidity is unknown.

Furthermore, Patent Publication 3 proposes low softening point glasses which are a $V_2O_5$—$TeO_2$—$WO_3$—$P_2O_5$ glass and a $V_2O_5$—$TeO_2$—$WO_3$—ZnO glass. In the above $V_2O_5$—$TeO_2$—$WO_3$—$P_2O_5$ glass, its fluidity is rather insufficient, and there seem to be an increase of its softening point as $P_2O_5$ is contained. Furthermore, in the above $V_2O_5$—$TeO_2$—$WO_3$—ZnO glass, the glass shows excellent fluidity, and its softening point is in a range of 335 to 383° C. in the examples where BaO component is added into the above essential components.

PRIOR ART DOCUMENTS

Patent Documents

Patent Publication 1: JP 11-312948 A
Patent Publication 2: JP 2004-250276 A
Patent Publication 3: JP 2007-182347 A

SUMMARY OF THE INVENTION

Technical Problem

As mentioned above, a sealing material which is capable of sealing at a low temperature such as 400° C. or less has been required. However, gold-tin solder is high-priced, and a glass containing lead affects the environment. Therefore, in recent years, there is a tendency to avoid using the glass containing lead. In addition, although the above-mentioned alternative materials have been proposed, a glass having a low softening point generally tends to be poor in terms of stability and easily devitrifies in baking or heating. Therefore, a low softening point glass, which has a low softening point and fluidity which is important for sealing, is still required.

Therefore, it is an object of the present invention to obtain a sealing material having a softening point and fluidity which are capable of sealing at a low temperature.

Solution to Problem

It is known that a $V_2O_5$—$TeO_2$—RO (at least one selected from the group consisting of MgO, CaO, SrO, and BaO)—ZnO lead-free glass, which contains $V_2O_5$, $TeO_2$, RO (at least one selected from the group consisting of MgO, CaO, SrO, and BaO), and ZnO as essential components, shows a low softening point. As a result of intensive studies, the inventors obtained knowledge that to make the $V_2O_5$—$TeO_2$—RO—ZnO lead-free glass contain an alkali metal component (=$R_2O$) can cause further lowering of the softening point. According to further studies, it was found that the softening point of such a lead-free glass can be lowered to 330° C. or less.

That is, the present invention is a lead-free glass, which is a $V_2O_5$—$TeO_2$—RO (at least one selected from the group consisting of MgO, CaO, SrO, and BaO)—ZnO glass and has a low softening point, comprising: 5-55 wt % of $V_2O_5$, 5-75 wt % of $TeO_2$, 1-25 wt % of RO (at least one selected from the group consisting of MgO, CaO, SrO, and BaO) in total, 0.1-6 wt % of ZnO, and 0.1-3 wt % of $R_2O$ (at least one selected from the group consisting of $Li_2O$, $Na_2O$, and $K_2O$) in total.

The lead-free glass of the present invention has excellent fluidity at low temperatures and it can be preferably used as a sealing material. In addition, in the present description, "low temperature" refers to 400° C. or less.

In general, when sealing is performed by using a glass powder, the sealing is performed at a temperature of the softening point of the glass or higher, more preferably at a temperature of the softening point plus 20° C. or more. As mentioned above, sealing at 400° C. or less is possible in the present invention. However, in the present invention, it is possible to obtain a glass having a softening point further lower than 400° C., so it is possible to set further lower temperature as a sealing temperature.

In the present invention, "lead-free" means that lead is substantially not contained in the glass component. For example, the content of PbO is less than 0.3 wt %.

In the addition, the above-mentioned fluidity was measured in the after-mentioned Examples. In the present description, the sample was heated at 350° C. for 10 minutes and cooled down to ordinary temperature. After this, the diameter of the sample was measured. When the measured diameter was enlarged 10% or greater, as compared with that of the sample before heating, the fluidity was judged as being excellent.

Effect of the Invention

According to the present invention, it is possible to obtain a $V_2O_5$—$TeO_2$—RO—ZnO lead-free glass, which has a softening point being capable of sealing at a low temperature such as 400° C. or less and contains $V_2O_5$, $TeO_2$, RO (at least one selected from the group consisting of MgO, CaO, SrO, and BaO), and ZnO as essential components.

DESCRIPTION OF EMBODIMENTS

The present invention is a lead-free glass, which is a $V_2O_5$—$TeO_2$—RO (at least one selected from the group consisting of MgO, CaO, SrO, and BaO)—ZnO glass and has a low softening point, comprising: 5-55 wt % of $V_2O_5$, 5-75 wt % of $TeO_2$, 1-25 wt % of RO (at least one selected from the group consisting of MgO, CaO, SrO, and BaO) in total, 0.1-6 wt % of ZnO, and 0.1-3 wt % of $R_2O$ (at least one selected from the group consisting of $Li_2O$, $Na_2O$, and $K_2O$) in total.

The present invention is a glass whose softening point is further lowered because of making the $V_2O_5$—$TeO_2$—RO—ZnO lead-free glass contain an alkali metal component (=$R_2O$). It is known that the $V_2O_5$—$TeO_2$—RO—ZnO lead-free glass shows a low softening point. A glass having a low softening point generally tends to be poor in terms of stability and easily devitrifies in baking or heating. Although the $R_2O$ component lowers the softening point, the glass easily devitrifies along with the increase of $R_2O$ content. According to studies based on the above knowledge, it has been found that it is possible to lower the softening point without the devitrification in the above-mentioned lead-free glass as long as the upper limit of the total of $R_2O$ component is 3 wt %.

Furthermore, when the lead-free glass of the present invention is applied on a substrate containing an alkali component such as a soda-lime glass and baked, it has been anew found that $R_2O$ component contained in the glass improves adhesion to the substrate. It is useful in a sealing material that the adhesion to the substrate is improved, because the glass becomes hard to peel off from the substrate when an impact is exerted.

In case of sealing by using a glass, in general, the glass is made into a powder shape, and the glass powder made into a paste by using an organic vehicle is applied at a predetermined position. After this, it is baked by heating. In addition, "lead-free glass" of the present invention comprises the glass powder and a state after baking it.

The lead-free glass of the present invention is explained below.

$V_2O_5$ has an effect of lowering softening point of the glass. It is contained in the glass in a range of 5-55 wt %. If it exceeds 55 wt %, depending on a balance to other components, it tends to be difficult to be vitrified, and even if it is vitrified, devitrification tends to be occurred. If $V_2O_5$ is less than 5 wt %, the effect of lowering softening point cannot be sufficiently provided. Preferably, the lower limit may be 24 wt %. More preferably, it may be 36 wt %. In addition, preferably, the upper limit may be 48 wt %.

$TeO_2$ has an effect of improving fluidity of the glass. It is contained in the glass in a range of 5-75 wt %. If it exceeds 75 wt %, it is hard to sufficiently lower the softening point because of lacking other components lowering the softening point. If it is less than 5 wt %, the $V_2O_5$—$TeO_2$—RO—ZnO glass cannot be obtained because the vitrification itself is difficult. Preferably, the lower limit may be 31 wt %. More preferably, it may be 40 wt %. In addition, preferably, the upper limit may be 70 wt %. More preferably, it may be 59 wt %.

In general, glasses having low softening points are low in stability, and devitrification tends to occur at the time of baking. Stability of a $V_2O_5$—$TeO_2$ glass tends to be roughly decided by the contents of $V_2O_5$ and $TeO_2$ and the content ratio of $TeO_2$ to $V_2O_5$. Therefore, in the present invention, the total of $TeO_2$ and $V_2O_5$ is preferably 60-98 wt %, and the content ratio of $TeO_2/V_2O_5$ is preferably 0.7-10.

$R_2O$ has effects to lower the softening point of the glass and to improve the fluidity. It is contained in a range of 0.1-3 wt % in total in the glass. If it is less than 0.1 wt %, the effect to lower the softening point may not be provided. Furthermore, if it is more than 3 wt %, the softening point is lowered as compared with case where $R_2O$ component is not added. However, the glass tends to be devitrified hard, so it become hard to flow. It is preferable to use $Li_2O$, $Na_2O$, and $K_2O$ as $R_2O$ component used. More preferably, $Li_2O$ may be essential. Furthermore, two or more components may be used while combining them. Preferably, the lower limit may be 0.3 wt %. More preferably, it may be 0.7 wt %. Further preferably, it may be 1.2 wt %. In addition, preferably, the upper limit may be 2.6 wt %. More preferably, it may be 2.4 wt %.

RO has an effect to thermally stabilize the glass and has a role to adjust liner expansion coefficient. It is contained in a range of 1-25 wt % in total in the glass. If it is less than 1 wt % or exceeds 25 wt %, the above effects may not be provided depending on the relations with other components. Furthermore, the fluidity at the time of softening tends to be decreased by crystallization. It is preferable to use BaO as RO component used. In addition, it is possible to reduce the linear expansion coefficient by combining two or more components and using them. Thus, it is preferable. Preferably, the lower limit may be 6 wt %. In addition, preferably, the upper limit may be 20 wt %. More preferably, it may be 16 wt %.

ZnO has effects of lowering the softening point and reducing thermal expansion coefficient of the glass. It is contained in a range of 0.1-6 wt % in the glass. In case that the content of ZnO exceeds 6 wt %, stability of the glass tends to be lowered and the fluidity at the time of softening tends to be decreased by crystallization. In addition, in case of becoming less than 0.1 wt %, it is not possible to obtain the above effects. Preferably, the lower limit may be 1 wt %. In addition, preferably, the upper limit may be 5 wt %. More preferably, it may be 4 wt %.

The above components that are $V_2O_5$, $TeO_2$, RO, ZnO, and $R_2O$ are essential components. Basically, it is preferable that $V_2O_5+TeO_2+RO+R_2O+ZnO$ is 100 wt %. Furthermore, optional components may be added to the above essential components, if a content of the optional components is in a range of 10 wt % or less, preferably 5 wt % or less, more preferably 3 wt % or less. As the optional components, it is possible to cite $Al_2O_3$, $Fe_2O_3$, NiO, CuO, CoO, $ZrO_2$, etc.

In addition, $Al_2O_3$, $Fe_2O_3$, NiO, CuO, CoO, $ZrO_2$, etc. suppress the devitrification and adjust the linear expansion coefficient. Moreover, it is preferable to contain 0.1-10 wt % of the total of at least one selected from the group consisting of $Fe_2O_3$, NiO, $Al_2O_3$ and CoO, which are especially effective in suppressing the crystallization. Furthermore, $V_2O_5+TeO_2+RO+ZnO+R_2O+Fe_2O_3+NiO+Al_2O_3+CoO+ZrO_2$ selected from the above-mentioned essential components and preferable optional components may be 100 wt %.

In addition, in the lead-free glass of the present invention, it is preferable that phosphoric acid is not substantially contained in the glass component. If phosphoric acid is contained, there are possibilities that moisture resistance and the fluidity become low. "Phosphoric acid is not substantially contained" means that the content of $P_2O_5$ can be less than 0.5 wt %. Moreover, preferably, it can be less than 0.1 wt %.

In addition, in the lead-free glass of the present invention, it is preferable that $Bi_2O_3$ is not substantially contained in the glass component. If such a lead-free glass of the present invention contains $Bi_2O_3$, devitrification tends to occur as the glass gets unstable. "$Bi_2O_3$ is not substantially contained" means that the content of $Bi_2O_3$ can be less than 1 wt %. Moreover, preferably, it can be less than 0.3 wt %.

In addition, it is preferable that contents of $WO_3$, $Nb_2O_5$, etc. are small quantity in the present invention, because these components increase the softening point. The content may be less than 5 wt % in total, more preferably, less than 1 wt %.

In general, when sealing is performed by using a glass powder, the sealing is performed at a temperature of the softening point of the glass or higher, more preferably at a temperature of the softening point plus 20° C. or more. As mentioned above, the present invention can achieve a seal at low temperatures such as 400° C. or less. However, according to the present invention, it enables the softening point of the glass powder to be 330° C. or less, more preferably 320° C. or less, thereby being able to make the temperature in sealing lower. Although the lower limit is not particularly limited, for example, it may be 250° C., preferably, 280° C.

In the lead-free glass of the present invention, it is preferable that the linear expansion coefficient in 30-200° C. is $100\text{-}180 \times 10^{-7}/K$. If the softening point is high, the linear expansion coefficient tends to decrease. Therefore, if the linear expansion coefficient is less than $100 \times 10^{-7}/K$, there is a case that the softening point excessively rises. If the linear expansion coefficient exceeds $180 \times 10^{-7}/K$, there is a case that the linear expansion coefficient is too high depending on the use. Furthermore, in embodiments of the present invention, it has been found that it is possible to be $160 \times 10^{-7}/K$ or less.

In addition, it becomes possible to reduce the above linear expansion coefficient while keeping low softening points by containing an inorganic filler in the lead-free glass of the present invention. That is, one of preferable embodiments of the present invention is a sealing material containing the lead-free glass and the inorganic filler, the sealing material containing the inorganic filler in a range of 1-35 vol % relative to the total volume of the lead-free glass and the inorganic filler.

By using the inorganic filler, the linear expansion coefficient of the sealing material containing the inorganic filler can be lowered. If the content of the inorganic filler is less than 1 vol %, the effect of reducing the liner expansion coefficient becomes insufficient. In addition, if the content of the inorganic filler exceeds 35 vol %, the fluidity in terms of the sealing material lowers. With this, sealing tends to be insufficient.

As the inorganic filler which is used in the present invention, it is possible to use zirconium phosphate compounds $(ZrO)_2P_2O_7$, $NaZr_2(PO_4)_3$, $KZr_2(PO_4)_3$, $Ca_{0.5}Zr_2(PO_4)_3$, $NbZr(PO_4)_3$, $Zr_2(WO_4)(PO_4)_2)$, zirconium compounds ($ZrSiO_4$, $ZrW_2O_8$), cordierite, β-eucryptite, $SiO_2$, etc. In particular, in case that the purposes are to decrease the liner expansion coefficient and improve the fluidity, it is preferable to use the zirconium phosphate compound or the zirconium compound as the inorganic filler.

One of the preferable embodiments of the present invention is a glass paste containing the glass powder composed of the above-mentioned lead-free glass and an organic vehicle. After kneading the glass powder and the organic vehicle making them into a paste, the glass paste of the present invention is applied to a predetermined part, and this is baked to seal a desired member. Furthermore, the inorganic filler described above may be mixed in the glass paste.

It is preferable that a solid content (the glass powder+the inorganic filler) is contained 20-80 wt % relative to the total mass of the glass paste. If it exceeds 80 wt %, the application becomes difficult because viscosity of the glass paste becomes too high. In addition, if it is less than 20 wt %, an airtight sealing becomes difficult due to decreasing the glass component excessively.

The above organic vehicle is composed of an organic solvent and an organic binder. The organic vehicle disappears by combustion, decomposition, and volatilization after heating and baking the glass paste.

The above organic binder disperses and keeps the glass powder and the inorganic filler in the glass paste. Furthermore, the organic binder is removed from the glass paste by the heat generated by baking the glass paste. In addition, similar to the above organic binder, the organic solvent is not particularly limited if it can be removed from the glass paste at the time of heating.

In addition, one of the preferable embodiments of the present invention is a method for producing electronic components, which is characterized by comprising the step of baking at a temperature exceeding the softening point in order to perform sealing after applying the above glass paste. As the above electronic components, for example, a semiconductor package, a crystal unit, a MEMS, etc. are mentioned.

In addition, the present invention can be preferably used for sealing at low temperatures. Therefore, in the above baking step, the baking temperature may be 400° C. or less, more preferably, 360° C. or less, further preferably, 340° C. Moreover, the present invention can naturally be used even if the baking temperature exceeds 400° C.

EXAMPLES

In the following, the present invention is specifically explained according to Examples and Comparative Examples.

1: Preparation of a Glass Powder

One (total amount of 50 g), in which a $V_2O_5$ powder, a $TeO_2$ powder, a BaO powder, a SrO powder, a MgO powder, a CaO powder, a $Li_2CO_3$ powder, a $Na_2CO_3$ powder, a $K_2CO_3$ powder, a ZnO powder, a $P_2O_5$ liquid (normal phosphoric acid), and an $Al_2O_3$ powder as raw material oxides had been mixed so as to have ratios (wt %) described in Table 1, was contained in a platinum crucible, and melted at approximately 1100° C. for 30 minutes in an electric furnace. By casting the obtained melted-product onto carbon and crushing it in a mortar, a glass powder was obtained. In addition, it was checked if crystals or non-dissolved materials existed at the time of the above casting. One vitrified with no problem was judged as ○, the other was judged as x, and they were described in Tables 1 and 2. Furthermore, the ratios in Tables 1 and 2 do not always sum to 100% due to fraction processing in the second decimal place.

In the above obtained glass powders, a glass material where 10 wt % (12 vol %) of a zirconium phosphate filler is mixed with the glass powder of Example 1 is treated as Example 9. A glass material where 5 wt % (6 vol %) of a zirconium phosphate filler is mixed with the glass powder of Example 2 is treated as Example 10. A glass material where 8 wt % (13 vol %) of a eucryptite filler is mixed with the glass powder of Example 2 is treated as Example 11.

TABLE 1

| | wt % Examples | | | | | | | | | | |
|---|---|---|---|---|---|---|---|---|---|---|---|
| | 1 | 2 | 3 | 4 | 5 | 6 | 7 | 8 | 9 | 10 | 11 |
| $V_2O_5$ | 40.5 | 41.4 | 3.7 | 42.8 | 43.1 | 42 | 42 | 43.4 | 40.5 | 41.4 | 41.4 |
| $TeO_2$ | 42.4 | 43.4 | 44.9 | 44.8 | 45.2 | 44.1 | 44 | 45.6 | 42.4 | 43.4 | 43.4 |
| BaO | 15.2 | 12.6 | 15.4 | 9 | 8.1 | 10.9 | 11 | 7.1 | 15.2 | 12.6 | 12.6 |
| SrO | | | | | | | | | | | |
| CaO | | | | | | | | | | | |
| MgO | | | | | | | | 0.5 | | | |
| ZnO | 1.5 | 1.5 | 4 | 1.6 | 1.6 | 1.6 | 1.6 | 1.6 | 1.5 | 1.5 | 1.5 |
| $Li_2O$ | 0.4 | 0.9 | 1 | 1.8 | 2 | 1 | | 1 | 0.4 | 0.9 | 0.9 |
| $Na_2O$ | | | | | | 0.4 | | | | | |
| $K_2O$ | | | | | | | 1.3 | 0.8 | | | |
| $Al_2O_3$ | | | | | | | | | | | |
| $P_2O_5$ | | | | | | | | | | | |
| Vitrification | ○ | ○ | ○ | ○ | ○ | ○ | ○ | ○ | ○ | ○ | ○ |
| Softening point ° C. | 317 | 309 | 315 | 300 | 294 | 306 | 308 | 310 | 317 | 309 | 309 |
| Filler | — | — | — | — | — | — | — | — | zirconium phosphate | zirconium phosphate | eucryptite |
| Linear expansion coefficient $\times 10^{-7}$/K | 146 | 150 | 143 | 150 | 151 | 148 | 147 | 150 | 103 | 135 | 143 |
| Fluidity | ◎ | ◎ | ○ | ◎ | ◎ | ◎ | ◎ | ○ | ○ | ○ | ○ |

2: Various Evaluations of Glass Powders

As to samples vitrified out of the obtained glass powders and glass materials (that is, what are ○ in "Vitrification" in Tables 1 and 2), softening point, linear expansion coefficient and fluidity were each measured. These results are also shown in Tables 1 and 2. In addition, the measurement methods of each item are as follows.

<Linear Expansion Coefficient>

Linear expansion coefficient was measured by a thermomechanical analyzer (TMA8310 made by Rigaku Corporation). In this measurement, linear expansion coefficient α was determined by using one as a measurement sample, in which the above sample had been melted and formed into a column of 20 mm×5 mmφ (height×diameter) whose upper and bottom surfaces had been formed in parallel, and by increasing the temperature from 30 to 200° C. at 5° C./min. In addition, as a standard sample, quartz glass was used.

<Softening Point>

Softening point was measured by a differential thermal analyzer (TG8120 made by Rigaku Corporation). A second inflection point of DTA curve obtained by heating the glass powder, which had been crushed in a mortar, to increase the temperature at 10° C./min was judged as the softening point.

<Fluidity>

Each obtained samples was pressed into a column shape of 10 mm high×10 mmφ in diameter by using a hand press machine, and heated on a soda-lime glass substrate at 350° C. for 10 minutes. After heating, it was cooled down to ordinary temperature, followed by measuring diameter of the sample which was cooled down. In an evaluation of fluidity, as compared with the measured diameter before heating, in case that it was enlarged 20% or greater (measured diameter of 12 mm or greater), it was judged as ◎, in case that is was enlarged 10% or greater to less than 20% (measured diameter of 11 mm or greater to less than 12 mm), it was judged as ○, in case that it was enlarged to less than 10% (less than 11 mm), it was judged as Δ, in case that it has no fluidity, it was judged as x. In addition, fluidity was not evaluated in Comparative Example 6, as the softening point was higher than 350° C., which is an evaluation criterion.

As to each samples obtained by the above, each of Examples 1 to 11 had excellent fluidity and each of their softening points was lower than 320° C. Therefore, they were useful to be used as a sealing material.

Comparative Examples 1 and 2 were crystallized in a step of casting the melted-product onto the carbon at the time of manufacturing the glass. Therefore, the following evaluations were not performed. In addition, softening points of Comparative Examples 3 and 4 were low. However, they devitrified at the time of evaluating fluidity, so they were not suitable for the purpose of the present invention. In addition,

TABLE 2

| | wt % Comparative Examples | | | | | | | |
|---|---|---|---|---|---|---|---|---|
| | 1 | 2 | 3 | 4 | 5 | 6 | 7 | 8 |
| $V_2O_5$ | 72 | 66 | 42.4 | 55.9 | 13 | 13 | 45.2 | 44.1 |
| $TeO_2$ | 9.2 | 3 | 44.5 | 38.4 | 67 | 67 | 47.5 | 46.3 |
| BaO | 15.9 | 20 | 7.9 | 2.7 | 13 | 17 | | 3.2 |
| SrO | | 1.3 | | | | | | |
| CaO | | | | | | | | 1.9 |
| MgO | | | | | | | | |
| ZnO | | 5 | 1.6 | 1.1 | 3 | 3 | 0.6 | 7.1 |
| $Li_2O$ | 1.6 | 1 | 0.4 | 1.9 | | | 3.5 | 0.6 |
| $Na_2O$ | | | 3.2 | | 4 | | | |
| $K_2O$ | | | | | | | | |
| $Al_2O_3$ | | 3 | | | | | | |
| $P_2O_5$ | | 2 | | | | | | |
| Vitrification | X | X | ○ | ○ | ○ | ○ | ○ | ○ |
| Softening point ° C. | — | — | 292 | 293 | 341 | 363 | — | 325 |
| Filler | — | — | — | — | — | — | — | — |
| Linear expansion coefficient $\times 10^{-7}$/K | — | — | 150 | 131 | 165 | 162 | — | 131 |
| Fluidity | — | — | Δ | Δ | ○ | — | X | Δ | in Comparative Example 5, fluidity was excellent. However, its softening point was higher than in any Examples and was not 320° C. or less unlike in Examples. In addition, the composition of Comparative Example 6 contained no $R_2O$, so it had the highest softening point. In addition, Comparative Example 7 was not crystallized at the time of manufacturing the glass. However, it was crystallized at the time of measuring softening point, linear expansion coefficient, and fluidity, so each evaluation couldn't be done. In addition, Comparative Example 8 showed excellent values in terms of softening point and linear expansion coefficient. However, its fluidity was insufficient, so it was not suitable for the purpose of the present invention.

3: Evaluation of Adhesion Between Glass Powder and Substrate

Adhesion between each glasses and the soda-lime glass substrate was simply evaluated by using the samples of Examples 1-8 and Comparative Example 3-5 after the above test of fluidity evaluation. After the test of fluidity evaluation, the glasses having flowed had adhered to the substrate in every samples. There were glasses which couldn't peel off from the substrate and finally the substrate was broken when trying peeling each glasses from the substrate. As to such glasses, it was evaluated that its adhesion was improved. The destruction occurred at boundary between a part of the substrate where the glass having flowed had adhered and a part of the substrate where the glass had not adhered.

According to the above results, it had been found that Adhesion had been improved in the samples of Examples 4-6. Examples 4-6 are the glass powders containing 1.4 wt % or more in total of $R_2O$, having 310° C. or less of the softening point, and being excellent in terms of fluidity in 350° C. Furthermore, it had been found that the glasses of Examples 1-3, 7, and 8 had a tendency to be hard to peel off with increase of the content of $R_2O$ component. When actually used on a soda-lime glass substrate, the above glass powders can be used as sealing materials by containing a material to adjust linear expansion coefficient such as an inorganic filler, etc. in order to prevent the substrate form being destroyed. On the other hand, in Comparative Example 3-5, the improvement of adhesion cannot be seen unlike Example 4-6.

4: Evaluation of Sealing Performance

A leak test with helium gas was conducted in order to evaluate a sealing performance of the glass powder. Sealed samples were pressed under a pressure of 0.2 MPa for two hours in a chamber in the atmosphere comprising helium. After that, the pressure of the samples were reduced, and leaked helium gas was detected by using a helium leak detector (HELIOT900 made by ULVAC, Inc.). The leak test was conducted to three evaluating samples, and the leak rate of $1\times10^{-9}$ Pa·m$^3$/sec or less was regarded as excellent sealing performance.

In the evaluation samples, two SUS 304 substrates, which are 25 mm-square, and a glass paste where each of glass powders of Examples 2, 4, and 11 and an organic vehicle were kneaded were used. Surfaces of the two substrates were faced each other, and the glass paste was applied between the two substrates. Furthermore, that was heated at 350° C. to paste the substrates. Thereby, samples were obtained. Then, as a distance was generated between the two substrates, the glass paste was applied so as to seal internal air. As a result, the leak rates were $1\times10^{-9}$ Pa·m$^3$/sec or less in all of samples. Therefore, it was found that they were excellent in terms of sealing performance.

The invention claimed is:

1. A lead-free glass, which is a $V_2O_5$—$TeO_2$—RO (at least one selected from the group consisting of MgO, CaO, SrO, and BaO)—ZnO glass and has a low softening point, comprising:
   5-55 wt % of $V_2O_5$,
   5-75 wt % of $TeO_2$,
   1-25 wt % of RO (at least one selected from the group consisting of MgO, CaO, SrO, and BaO) in total,
   0.1-6 wt % of ZnO, and
   0.1-3 wt % of $R_2O$ (at least one selected from the group consisting of $Li_2O$, $Na_2O$, and $K_2O$) in total.

2. A sealing material, comprising the lead-free glass as claimed in claim 1 and an inorganic filler, wherein a content of the inorganic filler is in a range of 1-35 volume % relative to a total volume of the lead-free glass and the inorganic filler.

3. A glass paste, comprising a glass powder composed of the lead-free glass as claimed in claim 1 and an organic vehicle.

4. A method for producing an electronic component, comprising a step of baking at a temperature exceeding a softening point in order to perform sealing after applying the glass paste as claimed in claim 3.

5. The method for producing the electric component as claimed in claim 4, wherein a baking temperature is 400° C. or less in the step of baking.

* * * * *